No. 780,214. PATENTED JAN. 17, 1905.
D. MONNIER.
VEHICLE FOR TRANSPORTING LIGHT LOADS AT HIGH SPEED.
APPLICATION FILED SEPT. 29, 1904.
4 SHEETS—SHEET 1.
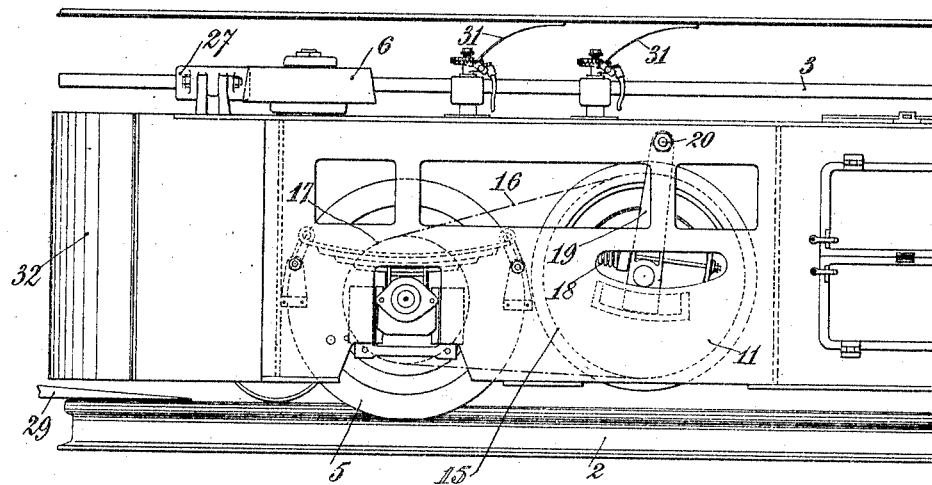
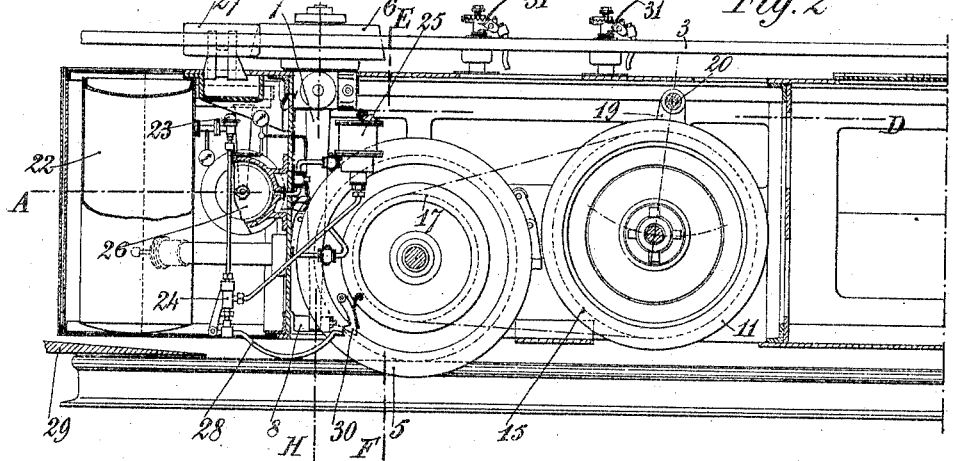
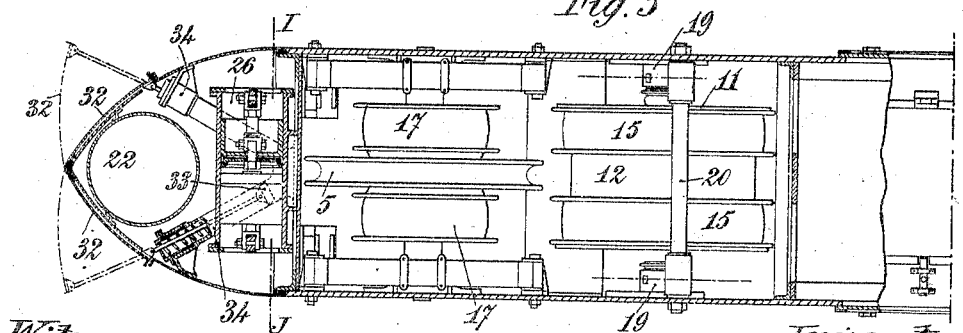
Witnesses:
Henry Thieme
J. George Barry
Inventor:
Dimitri Monnier
By attorneys
Brown & Seward No. 780,214. PATENTED JAN. 17, 1905.
D. MONNIER.
VEHICLE FOR TRANSPORTING LIGHT LOADS AT HIGH SPEED.
APPLICATION FILED SEPT. 29, 1904.

4 SHEETS—SHEET 2.

Witnesses:
Henry Thieme
F. George Barry

Inventor
Dimitri Monnier
By attorneys
Brown & Seward

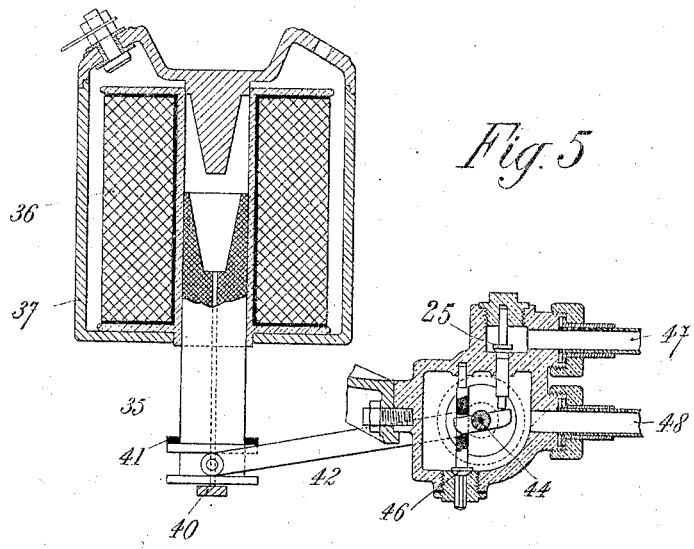
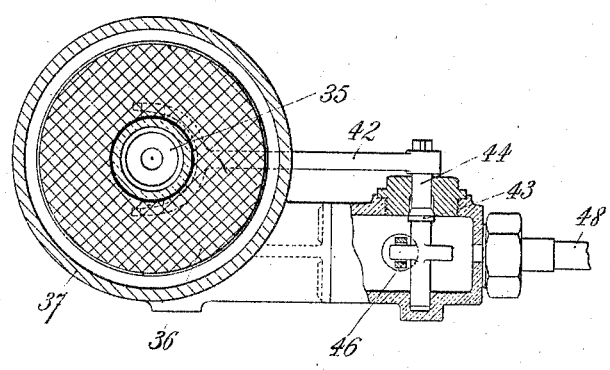

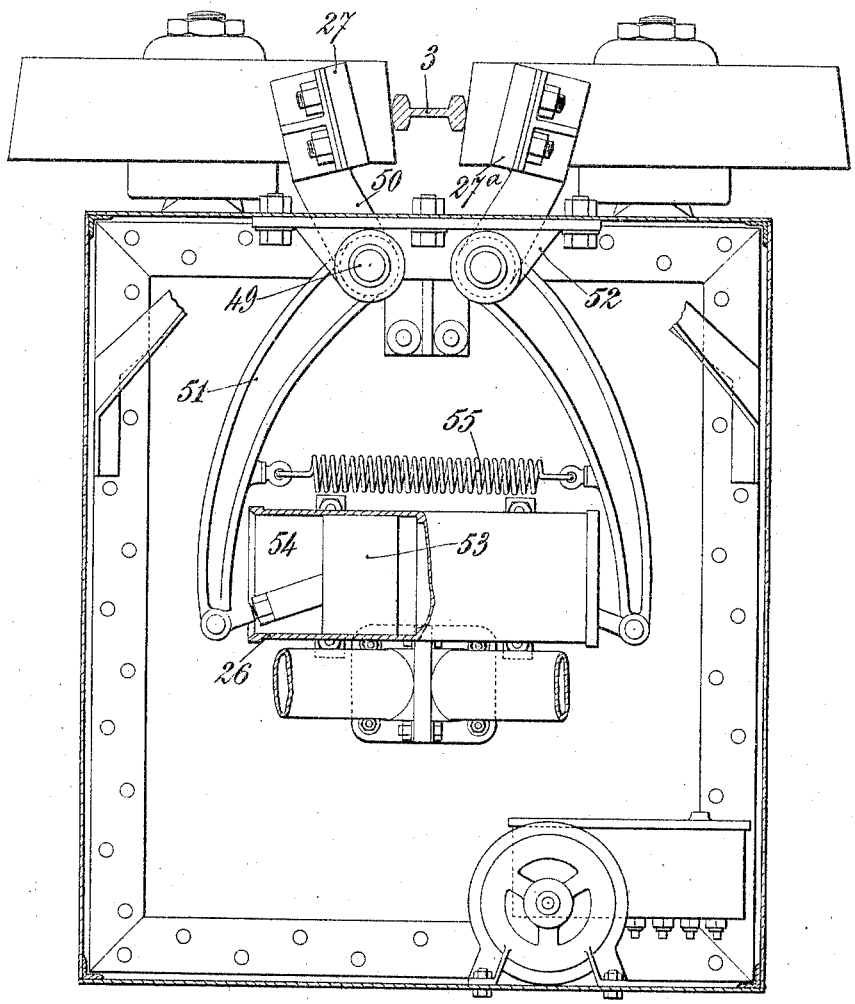

No. 780,214.

Patented January 17, 1905.

UNITED STATES PATENT OFFICE.

DIMITRI MONNIER, OF PARIS, FRANCE.

VEHICLE FOR TRANSPORTING LIGHT LOADS AT HIGH SPEED.

SPECIFICATION forming part of Letters Patent No. 780,214, dated January 17, 1905.

Application filed September 29, 1904. Serial No. 226,595.

*To all whom it may concern:*

Be it known that I, DIMITRI MONNIER, president of the Société Anonyme des Chemins de fer Electro-Postaux, a citizen of the Republic of France, and a resident of 53 Rue de Châteaudun, Paris, France, have invented a new and useful Improvement in Vehicles for Transporting Light Loads at High Speeds, of which the following is a specification, the said improvement having been part of the subject-matter of application Serial No. 170,719 for United States Patent, filed August 25, 1903.

My invention relates to special braking devices applicable to vehicles used for the electrical transport of letters, light parcels, and the like at high speeds on lines consisting each of a single running-rail with a guide-rail, the latter being arranged above the vehicle, which embraces it with two pairs of horizontal rollers. Said devices are designed to effect, in addition to the electric braking, a mechanical braking by the application of brake-blocks against the guide-rail and also a retarding action by the spreading of wings or movable shutters which serve to increase the resistance of the air to the motion of the vehicle, the action of the said blocks and said shutters being combined, as will be hereinafter explained.

Figure 1:
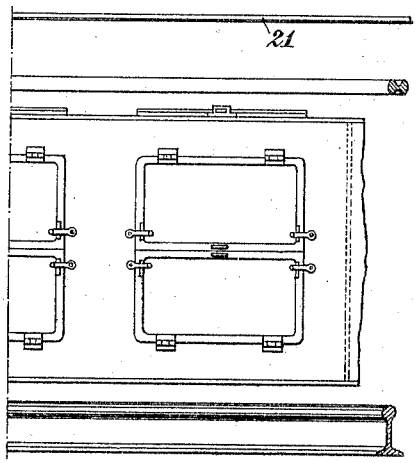
Figure 4:
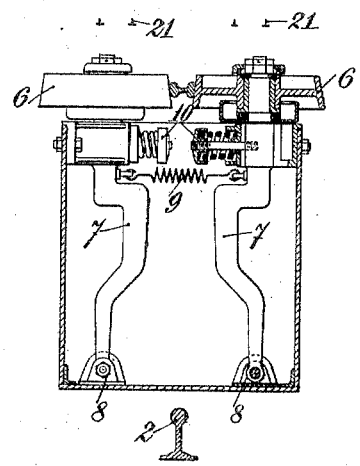
Figure 2:
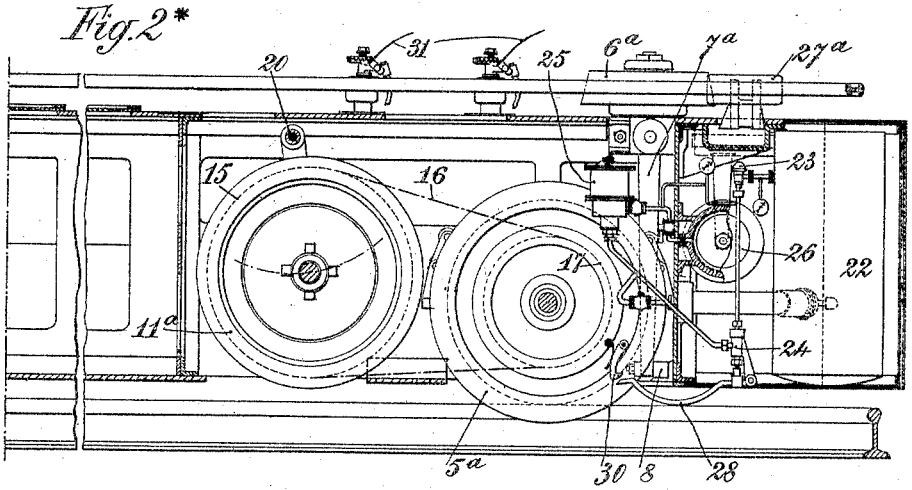
Figure 3:
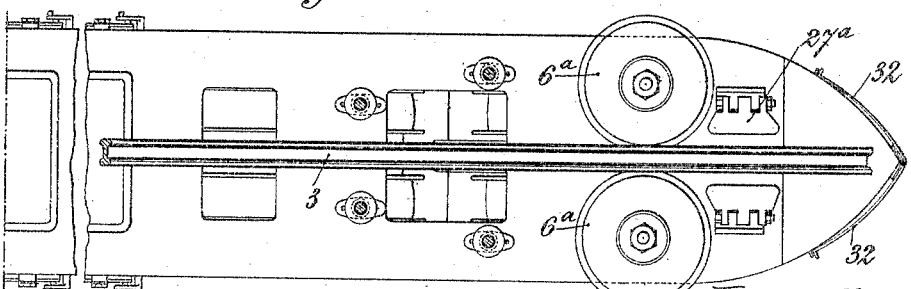

On the accompanying drawings, Figure 1 is a part side elevation of a vehicle embodying the invention. Fig. 1* is a continuation of Fig. 1. Fig. 2 is a part-vertical section of the vehicle. Fig. 2* is a continuation of Fig. 2. Fig. 3 is a part-horizontal section of the vehicle on the line A B C D, Fig. 2. Fig. 3* is a part plan of same. Fig. 4 is a cross-section on the lines E F and G H, Fig. 2. Figs. 5 and 6 show a vertical section and sectional plan of the electromagnetic valve of the brake apparatus. Fig. 7 shows a cross-section on line I J, Fig. 3.

2 is the running-rail, and 3 the guide-rail, of the line.

5 5$^a$ are the two driving-wheels of the vehicle, and 6 6 and 6$^a$ 6$^a$ the two pairs of horizontal guide-rollers, which are mounted on vertical axes 7 7 and 7$^a$ 7$^a$, the lower ends of which can turn on articulated joints 8 8$^a$. Each of the wheels 5 5$^a$ of the vehicle is driven by an electromotor 11 11$^a$, which is preferably one worked by polyphase currents. The casing of the rotor of each motor constitutes two pulleys 15 15, which by means of two belts 16 16 transmit to the corresponding wheel 5 or 5$^a$ the rotary effort of the motor, for which purpose the wheel carries two pulleys 17 17. The chamber for containing the objects to be transported is arranged between the two motors, as shown.

The current can be supplied to the motor of the above-said vehicle (which makes no part of the present invention) by means of sliding contacts 31 from three conductors 21. The running and guide rail might also be utilized as conductors, as also any other metallic structure. A fourth conductor 21 is employed for transmitting an indication of the position of the vehicle.

As the vehicle is intended to run at a great speed, the natural stopping distance would be very considerable. In order to shorten this, beside the retarding-couple produced by means of the motors braking devices are employed having the following effects: first, to apply brake-blocks to the guide-rails; secondly, to increase momentarily the resistance offered by the air. These devices are combined in the following manner: At the point where the braking is to be produced the conductors 21 are momentarily interrupted and are then continued by a section in which the current can be transposed in two of the phases so as to invert the direction of rotation of the motor fluid. By this means the electric braking is effected. Should there be a stoppage of the current from any cause, so that there would be a risk of the vehicle passing the station, this is prevented by bringing the mechanical brakes into action, as follows: The vehicle carries at each end a compressed-air reservoir 22, Figs. 2, 2* and 3, 3*, which by means of a reducing-valve 23 and two valves 24 25 supplies a brake-cylinder 26, which applies the brake-blocks 27 and 27$^a$ to the guide-rail 3. The valve 24 is controlled by a lever 28, which on entering the section where the braking is to be effected comes in contact with a fixed incline 29 and is thereby made to open the valve, so as to admit air-pressure to the brake-cylinder. The lever is held in that position by a spring-catch 30 so long as the vehicle is on the said section. The second valve 25, which is interposed between the valve 24 and the brake-cylinder, is electrically controlled by an electromagnet, which being included in one of the circuits of the motor or in the circuit of the fourth conductor keeps the valve 25 closed so long as current is being supplied. When the current is interrupted, the valve 25 opens, and valve 24 being also open air-pressure passes to the brake-cylinder. Referring to Fig. 7, the brake-blocks 27, adapted to bear against the guide-rail 3, are carried by levers 50, fixed on shafts 49, carried by brackets 52, to which shafts are fixed other levers 51, whose ends are connected by rods 54, respectively, to one of the two pistons 53 of the brake-cylinder 26, so that on admitting air-pressure between the pistons the brake-blocks 27 are pressed by the levers against the rail 3. A spring 55, connected to the levers 51, causes the brake-blocks to be withdrawn from the rail when the air-pressure is discharged from between the pistons. The arrangement of the valve apparatus 25 and of the electromagnet operating the same is shown at Figs. 5 and 6. A solenoid 36, contained in a casing 37, fixed to the framing and receiving a current from the supply-circuit 21, has an armature 35, the downward motion of which is limited by a stop 40 and which has its lower end connected to a lever 42, fixed on a spindle 44, contained in the casing 43 of valve 25. The spindle has two fingers, one of which operates the admission-valve 25, while the other operates a discharge-valve 46. The valve-casing 43 communicates by a pipe 47 with the before-mentioned valve 24 and by a pipe 48 with the middle of the brake-cylinder. The solenoid 36 being normally energized by the current, the armature 35 is held thereby in the raised position, in which it allows the valve 25 to close, while the discharge-valve 46 is opened, so that the brake-cylinder, and consequently the brake-blocks 27, are inoperative. When the supply-circuit 21 is interrupted, the armature 35 drops, and thereby allows valve 46 to close and opens the valve 25, so as to cause air-pressure to pass through pipes 47 and 48 to the brake-cylinder, so as to apply the brakes. It will be seen from the above-described arrangement that by interrupting the supply-circuit 21 at a station the electric motors can be stopped and the brakes applied when the vehicle is at any point on the line, while on closing the circuit again the vehicle will be made to proceed, so that the vehicles can be controlled at will from a station. The braking action is furthermore assisted by that of the four wings or shutters 32, two at each end of the vehicle. These shutters, which are closed normally, are fixed to pistons 33 in cylinders 34, that can communicate with the valve 24, so that on the opening of this valve by the lever 28 air-pressure is admitted to the cylinder 34, causing the pistons to open the shutters, and thereby to increase the resistance to the passage of the vehicle through the air.

Having now fully described my invention, what I claim as new, and desire to secure by Letters Patent, is—

1. An electrically-worked vehicle for the transport of light loads, an upper rail to guide said vehicle, brake-blocks adapted to be applied to said guide-rail, a compressed-air cylinder, two pistons in said cylinder, connected to said brake-blocks, a compressed-air reservoir, a pipe connecting said reservoir to the space in said cylinder between the two pistons, a valve between said compressed-air reservoir and said cylinder, an electromagnet arrangement opening said valve when the electric current thereto is interrupted, and springs to take the brake-blocks away.

2. An electrically-worked vehicle for the transport of light loads, an upper rail to guide said vehicle, brake-blocks adapted to be applied to said guide-rail, a compressed-air cylinder, two pistons in said cylinder, connected to said brake-blocks, a compressed-air reservoir, a pipe connecting said reservoir to the space in said cylinder between the two pistons, a valve between said compressed-air reservoir and said cylinder, an electromagnet arrangement opening said valve when the electric current thereto is interrupted, springs to take the brake-blocks away, a second valve between the compressed-air reservoir and the first-mentioned valve, an incline on the section of the line where the vehicle is to stop, and a lever moved by said incline and opening the second-mentioned valve.

3. An electrically-worked vehicle for the transport of light loads, an upper rail to guide said vehicle, brake-blocks adapted to be applied to said guide-rail, a compressed-air cylinder, two pistons in said cylinder, connected to said brake-blocks, a compressed-air reservoir, a pipe connecting said reservoir to the space in said cylinder between the two pistons, a valve between said compressed-air reservoir and said cylinder, an electromagnet arrangement opening said valve when the electric current thereto is interrupted, springs to take the brake-blocks away, a second valve between the compressed-air reservoir and the first-mentioned valve, an incline on the section of the line where the vehicle is to stop, a lever moved by said incline and opening the second-mentioned valve, shutters at the end of the vehicle capable of opening outward, a second compressed-air cylinder on the compressed-air pipe between the first and second mentioned valves, pistons in said second cylinder and connected to said shutters respectively.

In testimony that I claim the foregoing as my invention I have signed my name, in presence of two witnesses, this 17th day of September, 1904.

DIMITRI MONNIER.

Witnesses:
CHARLES ASH,
ARCHIBALD R. BAKER.